United States Patent [19]

Foth

[11] Patent Number: 4,771,516

[45] Date of Patent: Sep. 20, 1988

[54] DEVICE FOR THE INTER-CONNECTION OF ROPES

[76] Inventor: Istvan Foth, Nystugan, S-680 51 Stollet, Sweden

[21] Appl. No.: 81,545

[22] Filed: Aug. 4, 1987

Related U.S. Application Data

[63] Continuation of Ser. No. 805,613, Dec. 6, 1985.

[51] Int. Cl.[4] ............................................. F16G 11/00
[52] U.S. Cl. ................................... 24/115 R; 24/459; 403/396; 403/391
[58] Field of Search ............... 24/115 R, 115 H, 459; 403/396, 391, 399, 395, 400

[56] References Cited

U.S. PATENT DOCUMENTS

| | | | |
|---|---|---|---|
| 526,123 | 9/1894 | Boots et al. | 403/396 |
| 1,080,013 | 12/1913 | Landin | 24/115 R |
| 2,222,038 | 11/1940 | Larkin | 403/396 |
| 2,796,648 | 6/1957 | Peterson | 24/459 X |
| 2,942,899 | 6/1960 | Rifken | 403/391 |
| 3,130,258 | 4/1964 | Cobaugh | 403/391 X |
| 3,181,111 | 4/1965 | Maloney | 403/391 X |
| 3,897,664 | 8/1975 | Bogese II | 24/115 R X |
| 4,049,357 | 9/1977 | Hamisch | 24/115 H X |
| 4,236,281 | 12/1980 | Bottum | 24/115 R |
| 4,302,124 | 11/1981 | Wilks et al. | 403/391 |

FOREIGN PATENT DOCUMENTS 25585 of 1931 Netherlands ..................... 24/115 R Primary Examiner—Kenneth J. Dorner
Assistant Examiner—Laurie K. Cranmer
Attorney, Agent, or Firm—Murray and Whisenhunt

[57] ABSTRACT

The invention relates to a device for holding two ropes or corresponding elongated bodies together in a fixed relation to each other at a right angle or parallel to each other. The device is characterized in that it comprises two essentially identical halves (2, 11), each being provided with a recess (3, 12) into which the rope fits, and that these halves may be pressed together and be locked by means of snap locks (5, 6, 13 14) when pressed together, the axial or turning movement of the ropes in relation to each other being prevented by the force of friction, and according to a preferred embodiment, by pegs (4, 17) on the bottom of the recesses, and the separation of the ropes being prevented by the snap locks, and, according to a modification of the preferred embodiment, by a screw which extends through each of the halves of the device and therein between through each of the ropes.

10 Claims, 2 Drawing Sheets

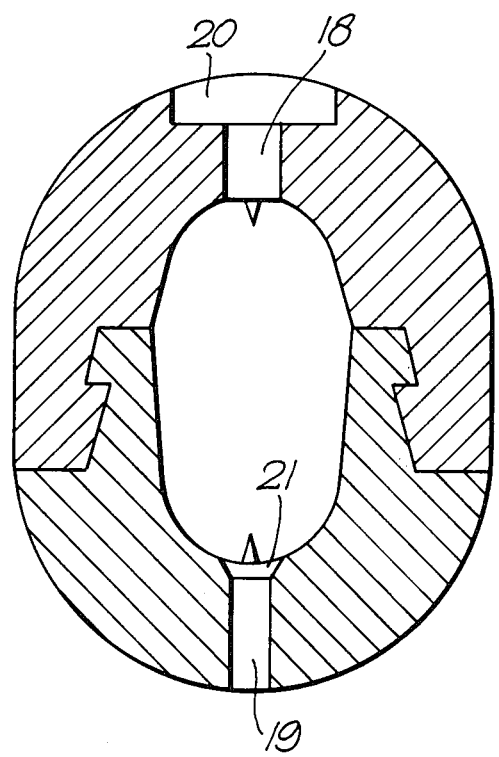

DEVICE FOR THE INTER-CONNECTION OF ROPES

This application is a continuation of Ser. No. 805,613, filed 12/6/85, now abandoned.

TECHNICAL SCOPE

This invention relates to the field of connective elements and specifically to a device for attaching two longitudinal bodies to each other.

BACKGROUND ART

The field of connective elements is very comprehensive. Even within the restricted field of attachment of ropes or rods to each other a large number of varieties have been conceived of.

One basis for separating such means of attachment is according to the angle formed by the two ropes or corresponding elements to be joined. The problem of connecting two similar ropes or corresponding elements perpendicularly to each other or to join them in parallel has more solutions than other types of problems of the same nature. In some cases several functions are combined in one element and in some cases the element is designed so as to permit the turning of one of the ropes about some axis in relation to the other rope.

Obviously, different reasons for joining ropes or the like cause different demands to be put on the attachment and the connective element. The dimensions of the connective element is strongly dependent on the dimensions of the rope or corresponding element. It is also significant whether the rope or corresponding element is soft or hard, stiff or flexible.

If the intention is to make a net of rope or string the classical method is to joint the strands by means of knots. When making large nets this is very time-consuming and laborious. The need for simple, easily assembled substitutes for the knots is great.

In some cases, the attachment must permit disassembly and reassembly.

Sometimes, the attachment requires special assembling tools.

The mass, volume, and cost of the connective element are very important in this context as in others.

Examples of prior art may be found in the following patent publications: U.S. Pat. 3,903,574 and DE No. 28 32 300, relating to perpendicular attachment using deformable metal clips; U.S. Pat. No. 3,747,166 and DE No. 20 58 099, relating to attachment devices which permit changing the angle between the strands after they have been put together, the former involving flexible plastic, the latter deformable metal; DE No. 25 49 939 relating to a very simple attachment by means of a piece of wire which is bent around the point of attachment; and U.S. Pat. No. 3,952,376 and 2,976,592, which relates to the joining of parallel ropes or corresponding elements.

DISCLOSURE OF THE INVENTION

The present invention relates to a device which affixes two ropes, rods, pipes, hoses, or corresponding elements to each other at a right angle, so that they become completely fixed in relation to one another, and to a corresponding device which affixes two parallel ropes or corresponding elements.

The invention relates to a connective element which is very easily assembled and cannot be disassembled once it has been put together. It is preferably provided with a smooth exterior and may be small and light. It may be made of a hard elastic material, such as steel or structural plastic. It may be used to join soft as well as hard elongated bodies, but is generally intended to be used with bodies which are not incompressible, such as ropes, hoses, plastic pipes, wooden poles, or suchlike. The two bodies which are to be held together may be of different shape and size from each other. The invention is not limited as to the cross-section of the bodies in question, as long as they are not significantly concave at the point of attachment.

The invention may be used to construct flat nets and loops, but if two connective elements are used at each point of attachment, three-dimensional networks may also be constructed.

The connective element comprises two parts. These two parts may be put together so that a unit is formed having a smooth exterior. Each part is provided with hooks and/or jags, exactly corresponding to jags and/or hooks in the other part, so that the two parts interlock as they are pressed together.

Each part is provided with a groove, the bottom part of which is of a shape which corresponds to one side of the longitudinal body which is to be held by the respective part. When each of the longitudinal bodies has been placed in its corresponding groove and the two parts have been pressed together so that the hooks have been caught in the jags, the bodies are connected and fixed. The bodies are fixed to each other by the friction against each other and against the insides of the parts of the connective element. Thereby, they are prevented from rotating and from moving longitudinally. In a preferred embodiment, the element of friction is aided by pointed extensions at or near the bottom of the grooves, penetrating slightly into the bodies. In one variant of the preferred embodiment, the two parts of the element have been provided with holes through their centres, the holes having a joint axis and permitting the passing of a screw through the two bodies and the two element parts.

Further characteristics and advantages of the invention will become apparent from the following description of a preferred embodiment and the appended patent claims.

BRIEF DESCRIPTION OF DRAWINGS

In the following description of a preferred embodiment, reference will be made to the attached drawings, wherein

FIG. 3 is a section through the element of FIG. 2, showing holes for a tapping screw and a recess for the sunk head of this screw in one of the two halves of the element.

DESCRIPTION OF A PREFERRED EMBODIMENT

Figure 1A:
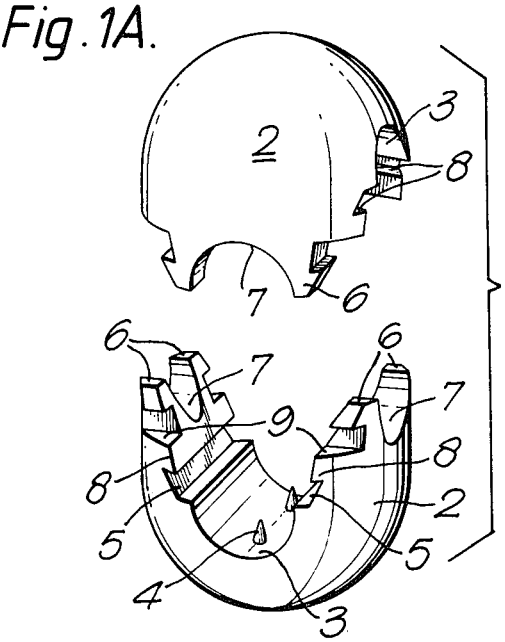
FIGS. 1A and 1B show a connective element for affixing two round ropes at a right angle to each other.
Figure 1B:
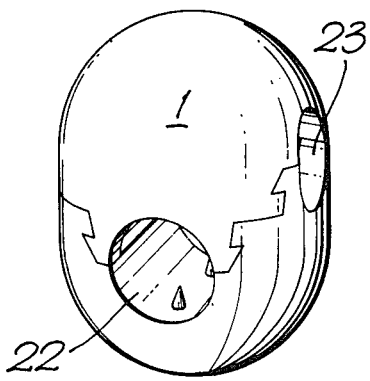
Figure 2A:
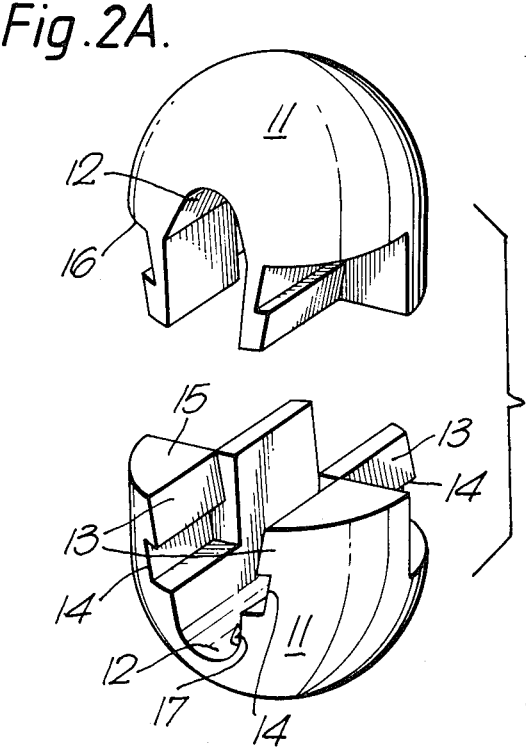
FIGS. 2A and 2B show a connective element for affixing two round ropes parallel to each other.
Figure 2B:
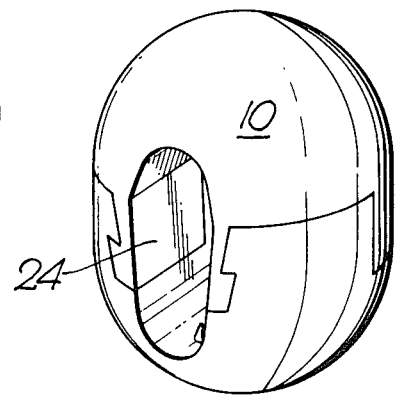

A connective element 1 for the attachment of two ropes or corresponding elements at a right angle to each other comprises two identical halves 2. Each half is provided with a groove 3, into which the rope fits. In the bottom of the groove there are two conical pegs 4, which penetrate into the outside of the rope when the two halves are pressed together. Along the edges of the groove there have been cut jags 5, the inner form of which corresponds to the outer form of hooks 6. Between the hooks 6 on each side of the groove 3 there is a recess 7, the bottom of which is shaped like the bottom of the groove 3.

As the ropes are put together, they are placed on top of each other at a right angle, and each half of the connective element is fitted on one of the ropes. As the halves are pressed together, the hooks 6 first bend slightly inward, so that they may slide past the edge 8 of the jag 5, and the expand and lock into the jag as the flat surfaces 9 meet and the element is fully compressed. The ropes are now locked, extending through the holes 22 and 23, respectively.

When two ropes are to be joined in parallel, an element 10 is used with two halves 11, each having a groove 12 corresponding to the shape and size of the rope. The hooks 13 and the jags 14 correspond, and interlock as the two halves are pressed together so that the surfaces 15 meet the surfaces 16. The bottoms of grooves 12 are provided with pegs 17. When compressed, the element 10 thus is provided with a hole 24, which extends through the element.

When there is foreseen an extreme strain on the connective element, it may be reinforced by a screw. In FIG. 3 this reinforcment has been depicted in the case of an element holding two parallel bodies. The bore 18 is a clearance hole and the bore 19 is threaded. The screw head is sunk in the recess 20. The conical recess 21 is intended to guide the tip of the tapping screw as it is being fastened. In the case illustrated, the screw extends through both of the ropes as well as both of the element halves.

I claim:

1. A device for holding together two elongated bodies essentially at right angles to each other in such a way that said bodies are prevented from rotating or sliding in relation to each other, said device comprising two parts which can be assembled to form a unit, said unit having two holes extending at right angles through said unit, each said hole having a cross-section corresponding to the cross-section of an elongated body to be held in said unit, each said part comprising an exterior smooth surface, the exterior surfaces of said parts together defining a smooth exterior of the unit, which has an oval cross-section in all planes coinciding with a central axis of symmetry of the device extending through the unit, said central axis extending through the exterior surface of the unit in a first and a second end thereof, said elongated bodies accommodated in said holes contacting each other in a central plane of the unit between said first and second ends of the unit, which central plane is perpendicular to said central axis, each said part comprising also an interior surface including a groove extending across the entire said part from one side of said part to the other in parallel with said central plane, said groove having a bottom facing away from the end of said part, which end is one of said first and second ends of the unit, and said groove having edges in the region of the central plane of the unit, each said part also having a first and a second recess on the opposite side of the central plane relative to the groove in said part, said first and second recesses being symmetrically provided in opposite side walls of said part, each of said recesses having a bottom substantially being tangential to said central plane, each of said two parts of said unit having hooks disposed on either side of said first and second recesses, and each of said two parts of said unit having jags disposed on either side of said groove and corresponding to the hooks of the other one of said two parts, said hooks, as said parts are pressed together to form said unit by an assembling force, being pressed aside and then, as said parts are pressed together, springing back into locking engagement with said jags and preventing disassembly of said unit after said assembling force has been withdrawn, each said hook having a rear part defining a wall portion means of said recess for frictionally engaging said elongated body, said groove of one of said two parts of the unit combining with said recesses of the other of said two parts to form a first of said two holes extending through said unit, and said groove of said other of said two parts of the unit combining with said recesses of the first of said parts to form a second of said two holes at right angles to said first hole, as said parts are pressed together.

2. A device according to claim 1, wherein said two parts are identical.

3. A device according to claim 2, wherein at least one essentially conical extension is provided in at least one of said grooves, said extension having a peak height which is not more than half the depth of the corresponding groove.

4. A device according to claim 3, wherein said peak height is not more than one fifth the depth of the corresponding groove.

5. A device according to claim 2, wherein one of said two parts is provided with a clearance bore for accommodating a tapping screw, said clearance bore opening at said bottom of said groove, the other part being provided with a corresponding bore coaxial with said clearance bore, said corresponding bore having a diameter suited for tapping by said tapping screw.

6. A device according to claim 5, wherein said bores coincide with centers of said grooves, as measured longitudinally of said grooves.

7. A device according to claim 2, wherein one of said two parts is provided with a clearance bore for a threaded screw, said clearance bore opening at said bottom of said groove, the other part being provided with a threaded bore, coaxial with said clearance bore, for said screw.

8. A device according to claim 7, wherein said bores coincide with centers of said grooves, as measured longitudinally of said grooves.

9. A device according to claim 2, wherein one of said two parts is provided with a first clearance bore for a threaded screw, said first clearance bore opening at said bottom of said groove, the other part being provided with a second clearance bore, coaxial with said first clearance bore, for said screw.

10. A device according to claim 9, wherein said bores coincide with centers of said grooves, as measured longitudinally of said grooves.

* * * * *